United States Patent [19]

Galloway et al.

[11] Patent Number: 5,536,594
[45] Date of Patent: Jul. 16, 1996

[54] ELECTROCHEMICAL CELL

[75] Inventors: Roy C. Galloway, Park Nook; Michael L. Wright, Allestree, both of England

[73] Assignee: Programme 3 Patent Holdings, Luxembourg, Luxembourg

[21] Appl. No.: 296,547

[22] Filed: Aug. 26, 1994

[30] Foreign Application Priority Data

Aug. 26, 1993 [ZA] South Africa .............. 93/6273

[51] Int. Cl.$^6$ ................................. H07M 10/39
[52] U.S. Cl. ............... 429/103; 427/215; 205/57; 205/60; 205/66
[58] Field of Search ............... 29/623.5; 205/57, 205/60, 66; 427/215; 429/103

[56] References Cited

U.S. PATENT DOCUMENTS

| | | | |
|---|---|---|---|
| 4,366,215 | 12/1982 | Coetzer et al. | 205/57 X |
| 4,722,875 | 2/1988 | Wright | 429/103 |
| 5,019,466 | 5/1991 | Coetzer et al. | 429/103 |
| 5,158,839 | 10/1992 | Wright | 429/103 |
| 5,194,343 | 3/1993 | Bloom et al. | 429/218 |
| 5,403,676 | 4/1995 | Coetzer et al. | 429/103 X |

FOREIGN PATENT DOCUMENTS

| | | |
|---|---|---|
| 2226442 | 6/1990 | United Kingdom . |
| 2227357 | 7/1990 | United Kingdom . |
| 2226692 | 7/1990 | United Kingdom . |
| 2276759 | 10/1994 | United Kingdom . |

*Primary Examiner*—Stephen Kalafut
*Attorney, Agent, or Firm*—Arnold, White & Durkee

[57] ABSTRACT

A method of making a cathode for a high temperature rechargeable electrochemical cell comprises impregnating a mixture, in granular form, of an alkali metal halide and a substance comprising a transition metal selected from the group consisting of iron, nickel, cobalt, chromium, manganese, and mixtures thereof, with an alkali metal aluminium halide molten salt electrolyte. The impregnated mixture is subjected to at least one charge cycle in a high temperature electrochemical cell in which the impregnated mixture forms the cathode and is located in a cathode compartment of the cell. The cathode compartment is separated from an anode compartment by a solid electrolyte separator. Alkali metal forms in the anode compartment during the charge cycle.

15 Claims, 9 Drawing Sheets

ELECTROCHEMICAL CELL

THIS INVENTION relates to an electrochemical cell. It relates also to a method of making a cathode, to a cathode, to a cathode precursor, to an electrochemical cell precursor, to a method of making a cathode precursor, and to a method of making a high temperature rechargeable electrochemical cell precursor.

According to a first aspect of the invention, there is provided a method of making a cathode for a high temperature rechargeable electrochemical cell, the method comprising impregnating a mixture, in granular form, of an alkali metal halide and a substance comprising a transition metal selected from the group consisting of iron, nickel, cobalt, chromium, manganese, and mixtures thereof, with an alkali metal aluminium halide molten salt electrolyte; and subjecting the impregnated mixture to at least one charge cycle in a high temperature electrochemical cell in which the impregnated mixture forms the cathode and is located in a cathode compartment of the cell, which is separated from an anode compartment by a solid electrolyte separator, and alkali metal forming in the anode compartment during the charge cycle.

The alkali metal and halogen of the alkali metal halide, and of the molten salt electrolyte may typically be the same. The alkali metal may be a mixture of alkali metals, or, preferably, a single alkali metal, eg lithium or, preferably, sodium. Thus, the alkali metal halide may be sodium halide, the alkali metal of the alkali metal aluminium halide also being sodium, and the separator being a solid conductor of sodium ions.

The halogen may be chlorine, so that the sodium halide is sodium chloride, and the electrolyte is a sodium aluminium chloride electrolyte. In particular, the electrolyte may be $NaAlCl_4$.

The method may include, prior to the impregnation, forming the granular mixture. This may be effected by blending together sodium chloride in powder form and the transition metal in powder form; and granulating the resulting powdered blend.

The invention will hereinafter be described in more detail utilizing nickel as the transition metal; however, it is to be appreciated that instead of nickel any one of the other transition metals, ie iron, cobalt, chromium, manganese and even mixtures thereof, can be used analogously.

The method may include using, in the blend, sufficient of the transition metal, eg nickel, so that less than 50%, by mass, of the nickel is used during charging, with the remainder acting as an electronically conducting backbone of the cathode when the cell is fully charged. Preferably, sufficient nickel is used so that about 30% by mass of the nickel is used during charging. It is believed that this will enhance capacity stability.

The nickel should have a high surface area, eg a surface area of about 0.6 $m^2/g$ (BET), and is preferably that obtained from the so-called carbonyl process. In particular, it may be that obtainable as Grade 287 or Grade 255 from Inco Nickel Company, or the like.

Instead, the nickel can be used in the form of a precursor such as nickel oxide (NiO), which is then reduced prior to making the cathode.

The sodium chloride may have a particle size <63µm (microns or micrometer). In particular, it may be that obtainable under the designation 'Microfine Grade' from Custom Powders Inc., or other manufacturers of fine milled salt.

The granulation may be effected by compacting the powdered blend, and breaking the compacted blend into granules. The compaction of the blend may be effected by passing the blend of powders between rollers at a pressure of 110–120 bar. Material <355µm may be recompacted.

The method may include adding to the blend, prior to granulation, at least one additive.

Thus, up to 1% by mass or more, based on the total blend mass, aluminium powder for generating porosity as it forms $NaAlCl_4$ and thus promotes full charge on the maiden charge. In addition, it generates a small amount of sodium to wet the anode compartment side of the solid electrolyte separator, and also provides some overdischarge capacity.

Instead, or additionally, some sodium fluoride (NaF) can be added as dopant, to provide additional capacity, to enhance long term stability, and to reduce sensitivity of the cell to overcharging. Amounts between 1.5% and 5%, or even more, based on the total blend mass, of NaF can be used.

Still further, an additive for poisoning nickel crystal growth may instead or additionally be added to the blend. This additive may be a chalcogen such as sulphur or selenium, a metal chalcogenide such as a sulphide or selenide of iron, cobalt, nickel or molybdenum, and/or a suitable transition metal selected from the group consisting in cobalt, iron, titanium, vanadium, tungsten and molybdenum.

Cathodes made in accordance with the above-described method will typically be used in electrochemical cells in which the active anode substance or material comprises sodium, the charged anode being molten sodium, the molten salt electrolyte being liquid at the operating temperature of the cell and the active anode material being separated from the cathode and molten salt electrolyte by the separator which comprises a solid conductor of sodium ions such as beta-alumina or nasicon. It follows that the cathode may be made in the cell in which it is eventually intended to be used, or, instead, it may be made in a separate cell, from which it may be removed after formation, and loaded, either in its charged or uncharged state, or in a partially charged state, into the cell in which it is eventually to be used. When the cathode is to be removed after formation, it may be put through several charge/discharge cycles in the cell in which it is formed, before removal.

Impregnation of the granular mixture with the molten salt electrolyte may simply be by wetting the granules with the electrolyte in molten liquid form. However, the impregnation is preferably effected by saturating the mixture with the molten salt electrolyte in molten liquid form.

Prior to the impregnation, the granules may be consolidated, eg by tamping, and heated to a temperature greater than the melting temperature of the electrolyte before the molten electrolyte is impregnated into the mixture. The consolidation and heating, and hence the impregnation, may be effected after loading the granules into the cathode compartment of the cell in which the charge cycle takes place. This will in effect provide a cathode precursor, the finished cathode or a finished cell, as the case may be, being obtained from its precursor by taking it through at least one charge cycle.

During the initial charge, the substance comprising the transition metal is chlorinated, alkali metal being produced in ionic form during said chlorination, which alkali metal moves through the molten liquid electrolyte and separator in ionic form, into the anode compartment where it emerges and exists in the charged or partially charged cell as molten metal, electrons passing during the charging along the external circuit employed for the charging, from the cathode compartment to the anode compartment. In accordance with the method of the present invention, and when making a cathode precursor and/or cell precursor (as hereinafter defined) in accordance with the present invention, it is accordingly in principle unnecessary to provide any starting alkali metal in the anode compartment, the alkali metal being produced during the first charge cycle as required for use in the method and/or for use as anode material in the eventual cell.

At the start of the first charge cycle to which the impregnated granules are subjected, the anode compartment may thus contain no alkali metal, a wicking material lining the surface of the separator directed into the anode compartment being used to wick anode material over said surface as it is produced during said first charge cycle. To prevent any potentially harmful pressure build-up in the anode compartment during the first charge cycle, the anode compartment may be evacuated prior to the start of the first charge cycle to which the impregnated granules are subjected.

In a particular embodiment of the invention, the separator may be in the form of an elongated tube, with the interior of the tube forming the anode compartment. To facilitate wicking, this tube may be aligned with its longitudinal axis substantially horizontal during each charge cycle to which the impregnated granules are subjected.

Suitable separators are readily available in the form of beta-alumina tubes which are solid conductors of sodium ions and can be used when the alkali metal of the alkali metal chloride and alkali metal aluminium halide liquid electrolyte is sodium. When the interior of the elongated separator tube forms the anode compartment, the tube may be located in a cell housing which defines a cathode compartment outside the tube, in the interior of the housing. In this construction, if the tube is evacuated prior to the first charge cycle, as mentioned above, the tube will then typically be sealed under vacuum, before the first charge cycle is started.

In the case of a beta-alumina tube, and when wicking material is used as described above, the wicking material may be spread over the surface of the separator facing into the anode compartment, such as the inside of the tube wall. This wicking material may be iron or nickel mesh, and may optionally be tinned. This mesh conveniently acts as part of an anode current collector and may be attached to an evacuation pipe of the same metal, used to evacuate the tube interior prior to the first charge cycle, and projecting out of the cell to form the remainder of the anode current collector and/or to form one of the cell terminals.

The invention extends to a cathode for a high temperature rechargeable electrochemical cell, whenever made by the method hereinbefore described. The invention also extends to an electrochemical cell having such a cathode.

According to a second aspect of the invention, there is provided a cathode precursor for a high temperature rechargeable electrochemical cell, the precursor comprising a mixture, in granular form, of an alkali metal halide and a substance comprising a transition metal selected from the group consisting of iron, nickel, cobalt, chromium, manganese and mixtures thereof, with the mixture impregnated with an alkali metal aluminium halide molten salt electrolyte.

The mixture may then be contained in a container, with the container forming a cathode compartment for use in an electrochemical cell, and the container having a wall at least partially comprising solid electrolyte material. The solid electrolyte may have, on its surface remote from the impregnated mixture, a layer of wicking material thereon for wicking molten anode material over said surface.

According to a third aspect of the invention, there is provided an electrochemical cell precursor which comprises a cathode precursor as hereinbefore described, and means defining an anode compartment into which is directed the surface of the solid electrolyte remote from the impregnated mixture.

According to a fourth aspect of the invention, there is provided a method of making a cathode precursor for a high temperature rechargeable electrochemical cell, the method comprising impregnating a mixture, in granular form, of an alkali metal halide and a substance comprising a transition metal selected from the group consisting of iron, nickel, cobalt, chromium, manganese, and mixtures thereof, with an alkali metal aluminium halide molten salt liquid electrolyte.

The method may include loading the mixture into a container having a wall at least partially comprising solid electrolyte and lining the surface of the solid electrolyte remote from the mixture with a wicking material for wicking anode material over said surface.

According to a fifth aspect of the invention, there is provided a method of making a high temperature rechargeable electrochemical cell precursor which comprises loading a cathode precursor as hereinbefore described into a cell casing having means defining an anode compartment into which is directed the surface of the solid electrolyte material remote from the impregnated mixture.

The main current collector of the cathode of a cell as described above with an anode compartment inside a beta-alumina tube, will usually be the outer housing itself which may be a metal such as the metals mentioned above as suitable for the cathode granules. In this case the housing may be the same metal as that of the granules, or one with a higher charging potential, so that it remains metallic at all times. To improve the initial activation or charging characteristics of the cell, the cathode current collector may include a metal mesh or gauze embedded in the granules and connected, eg by welding, to the housing.

For close packing in batteries, the cell may have an elongate rectangular housing along the interior of which the tube extends in a more or less central position. To facilitate wicking in the anode compartment, the cell may, as mentioned above, be used horizontally, but this can lead to voids in the cathode compartment formed upon charging as sodium moves into the anode compartment. For this reason the cell may incorporate an electrolyte reservoir, more or less separate from, but in communication with, the cathode compartment, from which electrolyte can pass, eg by draining under gravity, into the cathode compartment, to keep it flooded with liquid electrolyte at all times. Naturally, for close packing, cells of similar construction but having a hexagonal cross section can be employed instead.

As regards the molten salt electrolyte, this should be selected so that, at all states of charge, the solubility therein of nickel chloride is at a minimum. This is achieved when the electrolyte comprises a mixture of sodium halide and aluminium halide in a 1:1 mole ratio, with the molten salt being in the presence of at least some solid sodium chloride at all stages of charge, ie a neutral electrolyte. When a beta-alumina separator is used, the only alkali metal present should be the sodium as other alkali metals can adversely affect the separator. Although pure sodium aluminium chloride can be used, a minor proportion of up to 10% on a molar basis, or more, of the electrolyte may be made up of sodium fluoride, as mentioned above, preferably about 5%. It is believed that the sodium fluoride will replace the equivalent proportion of sodium chloride, so that said 1:1 mole ratio is retained. The proportion of sodium fluoride will however be sufficiently low for the electrolyte to retain its essential character as a sodium aluminium chloride electrolyte. In the charging reaction, as sodium chloride in the liquid electrolyte is consumed, solid sodium chloride in the cathode compartment will go into solution in the liquid electrolyte. There must thus be enough sodium chloride, as mentioned above, for some solid sodium chloride to remain in the cathode compartment when the cell is fully charged.

The invention will now be described by way of example with reference to the accompanying drawings.

Figure 1:
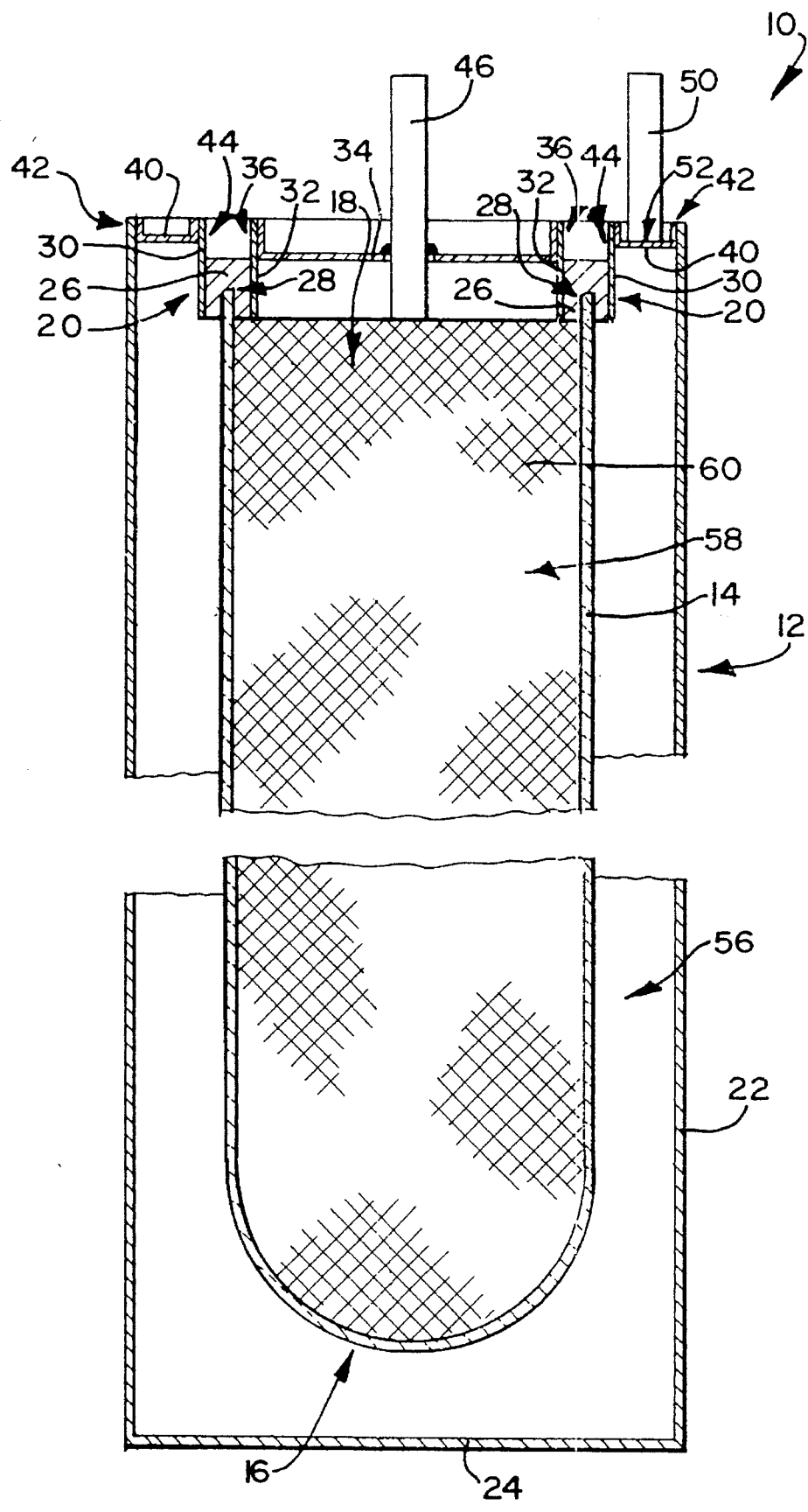
FIG. 1 shows, diagrammatically, a longitudinal sectional view of a cell in accordance with the present invention.

Referring to FIG. 1, reference numeral 10 generally indicates an electrochemical cell in accordance with the invention.

The cell 10 includes an outer cylindrical casing 12 having a side wall 22 connected to a circular end wall 24; a beta-alumina tube 14 located concentrically within the casing 12, the tube being closed at its one end 16 and open at its other end 18; and a collar assembly 20 around the end 18 of the tube 14. The collar assembly 20 comprises a circular insulating ring 26 of alpha-alumina, with the end 18 of the tube 14 connected to the ring 26 by being sealingly located in an annular groove 28 in the ring.

Two concentric truncated cylinders of nickel, designated 30, 32, are bonded fluid-tightly to the outer and inner curved surfaces respectively of the ring 26. An annular closure disc 34 closes off the open end 18 of the tube 14, the disc 34 being secured to the truncated cylinder or ring 32 at 36. An annular disc 40 also closes off the end of the casing 12 remote from the floor 24, the disc 40 being secured, for example by being welded, to the casing at 42 and to the ring 30 at 44. A steel rod current collector 46 projects into the tube 14, while a steel rod current collector 50 protrudes from the disc 40 at 52.

An anode compartment 56 is thus provided outside the tube 14, within the casing 12, with a cathode compartment 58 being provided inside the tube 14, the beta-alumina tube 14 hence constituting a separator between the anode and cathode compartments. A granular cathode precursor 60, as described in more detail hereunder, is introduced into the cathode compartment 58. The anode compartment 56 initially contains no anode material. Sufficient molten NaAlCl$_4$ electrolyte is then added to the cathode compartment so that the granules are impregnated with the electrolyte, and the electrolyte wets the separator or tube 14. The loading of the granular precursor 60 into the compartment 58 and the impregnation of the granules with electrolyte naturally takes place before closing off of the tube 14 as hereinbefore described. The beta-alumina tube 14 hence forms a continuous barrier between the electrolyte-containing cathode compartment 58 and the anode compartment 56, within the housing 12. Initially, electronic contact is provided between the outside of the tube 14 and the casing 12 by several resiliently stressed bent steel shims (not shown), located at suitable positions between the tube 14 and casing 12 and in resilient contact therewith. Later, when sodium passes through the separator on charging, it will build up sufficiently in the anode compartment to provide direct contact between the tube 14 and casing 12. If desired, an optional porous wicking layer (not shown), containing finely divided electronically conductive particles such as iron or nickel particles, may be provided as a lining on the outer surface of the tube 14 to facilitate wetting of the outside of the tube 14 with sodium and to promote electronic contact with the shims.

On charging, the following reaction takes place in the cathode compartment:

$$2NaCl + Ni \Leftrightarrow 2Na + NiCl_2 \qquad (1)$$

The sodium generated by reaction (1) passes through the beta-alumina into the anode compartment.

To form the cathode precursor 60, nickel and sodium chloride, in powdered form, are first blended together. Sufficient nickel is used so that about 30% of the nickel is involved in the charging process of the cell 10, with the remainder acting as an electronically conducting backbone in the cathode compartment 58, when the cell is fully charged. If less nickel is used, the cell will still function, but it has been found that, if more than 50% of the nickel is involved in the charging process, capacity stability diminishes with decreasing amounts of nickel used.

The nickel powder has a high surface area of 0.6m$^2$/g (BET), and is made by the so-called carbonyl process. In particular, it may be that obtainable as grades 287 or 255 from Inco Nickel Company. Higher density grade nickel, such as Inco Nickel Company's grade 123, can also be used, but cathodes made from this grade take several cycles to run in, in contrast to those made from grades 287 or 255 which are run in during the first charging cycle. Instead, high surface area nickel can be produced in situ by using as a precursor nickel oxide (NiO) powder which is then reduced prior to cathode manufacture.

Figure 2:
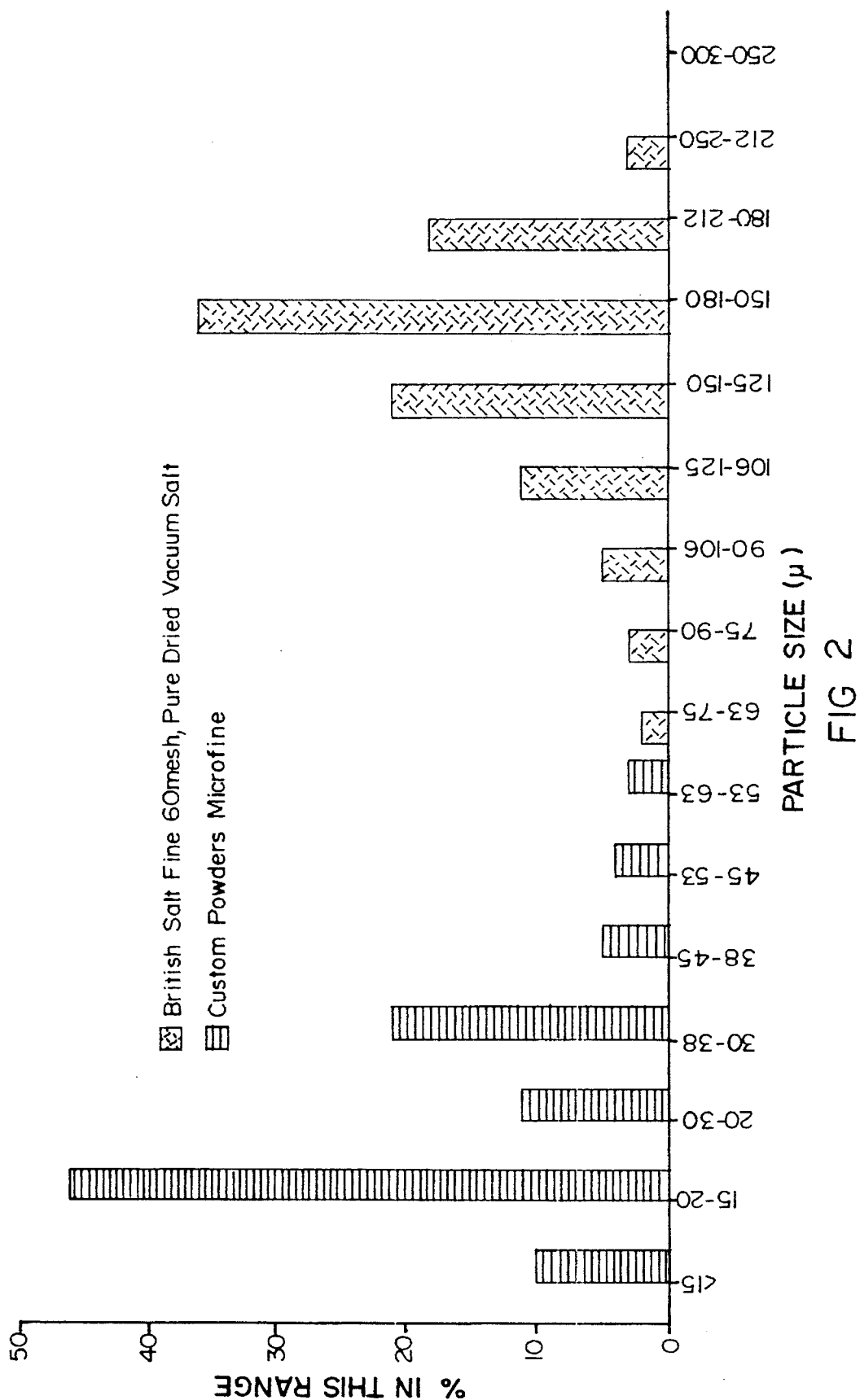
FIG. 2 shows a particle size analysis of powdered sodium chloride, for use in the cathode of the cell in FIG. 1, from two sources.
Figure 3:
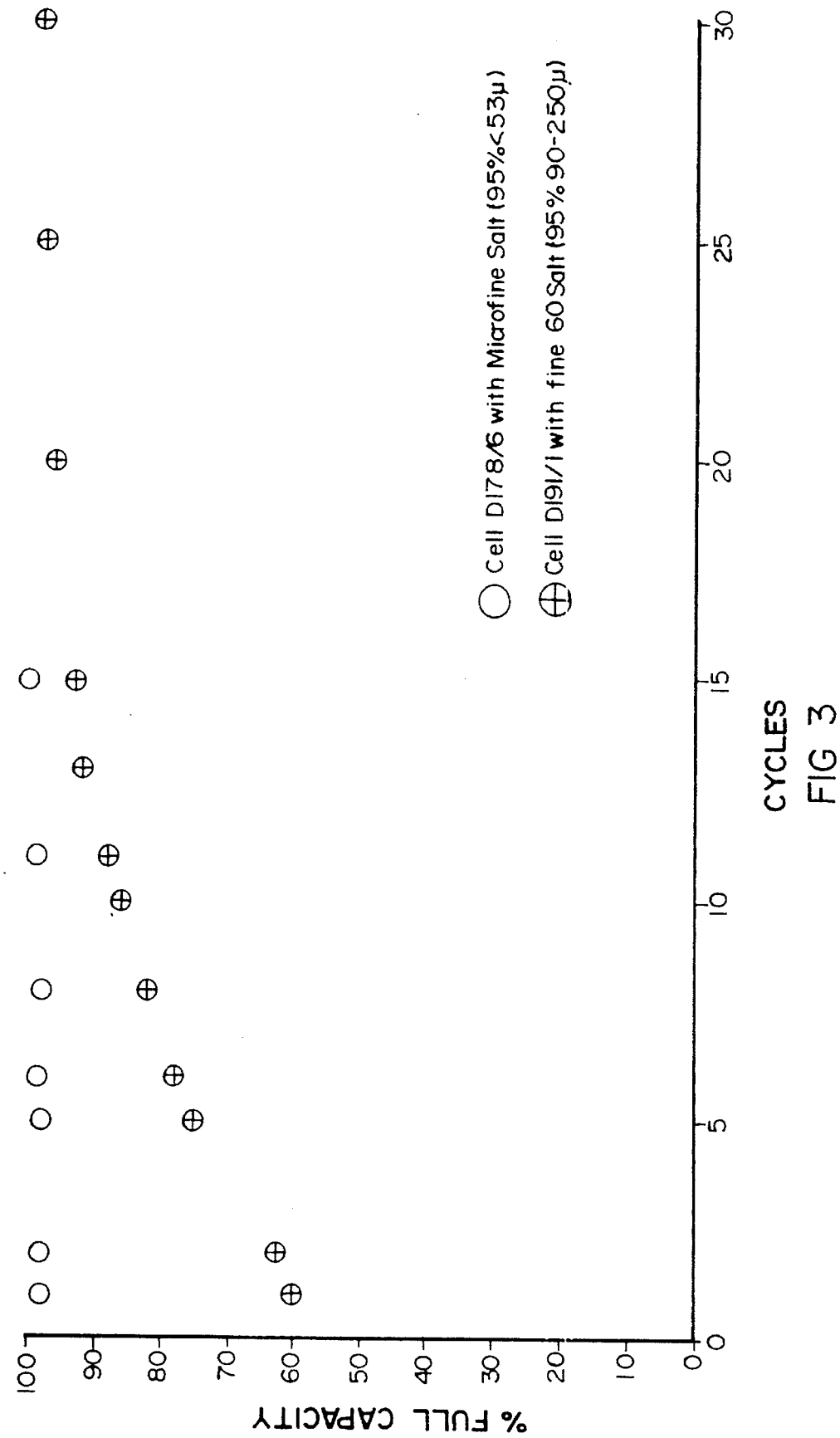
FIG. 3 shows plots of cell capacity v charge/discharge cycles for cells in accordance with FIG. 1, showing the effect of sodium chloride article size on cell capacity over a number of charge/discharge cycles.

It is preferred to use sodium chloride that is finely divided, ie Microfine Grade, having a particle size less than 63 microns. As is evident from FIG. 3, a cell 10 having a cathode which is made from Microfine Grain salt is preferred since no running in is required—full capacity is obtained on the first charge cycle. In contrast, as is also evident from FIG. 3, this is not achieved with a coarser grade of salt having a particle size range of 90–250 microns, with FIG. 2 showing a comparison between the particle size ranges of the two grades of sodium chloride.

Figure 4:
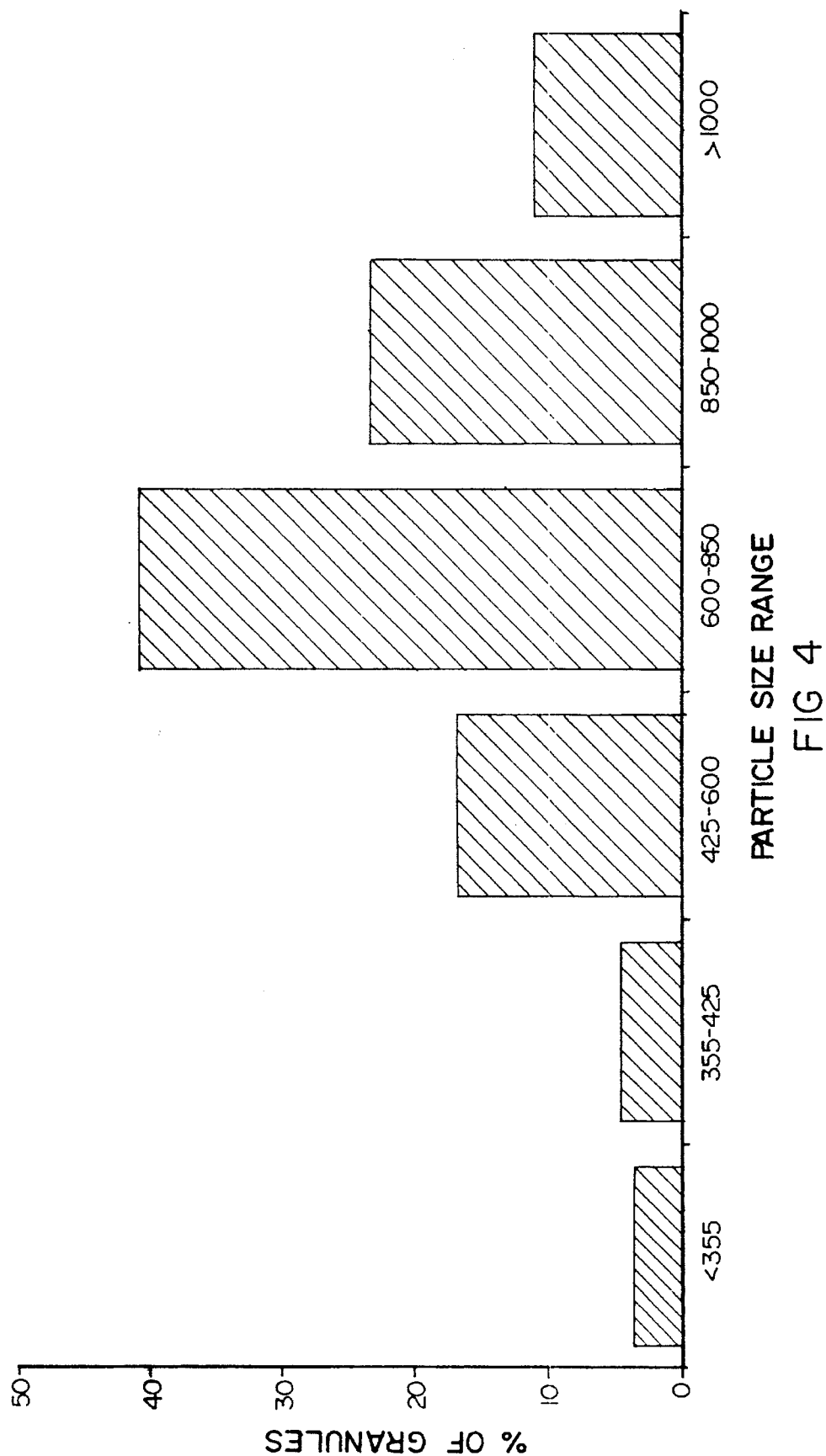
FIG. 4 shows a particle size distribution of the cathode granules of the cell of FIG. 1.

Thereafter, the blended powder is granulated. This is effected by compacting the powder through rollers at a pressure between 110 and 120 bar. The compacted flakes are broken down into granules in known fashion. FIG. 4 shows the preferred granule size ranges. Material below 355 microns is regarded as fines, and is re-compacted.

Additives or dopants can conveniently be incorporated into the cathode precursor by adding them in powdered form to the blend of powders prior to granulation. Thus, up to 1% by weight, based on the total mass of the powder blend, aluminium powder may be added. On the initial charge cycle of the cell 10, extra NaAlCl$_4$ as well as a small amount of sodium to help prime the wicking layer and provide some overdischarge capability, is produced according to the reaction:

$$Al + 4NaCl \rightarrow NaAlCl_4 + 3Na \quad (2)$$

The granulation method according to the invention of preparing the cathode precursor 60, provides an even distribution of aluminium powder throughout the resultant cathode. The relatively low melting point of aluminium (660° C.) restricts its use in a sintering method of forming the cathode 60. In addition, if it is attempted to incorporate such aluminium in a cathode prepared by a sintering process, it can alloy with the nickel during sintering, with activity then being lost.

Figure 5:
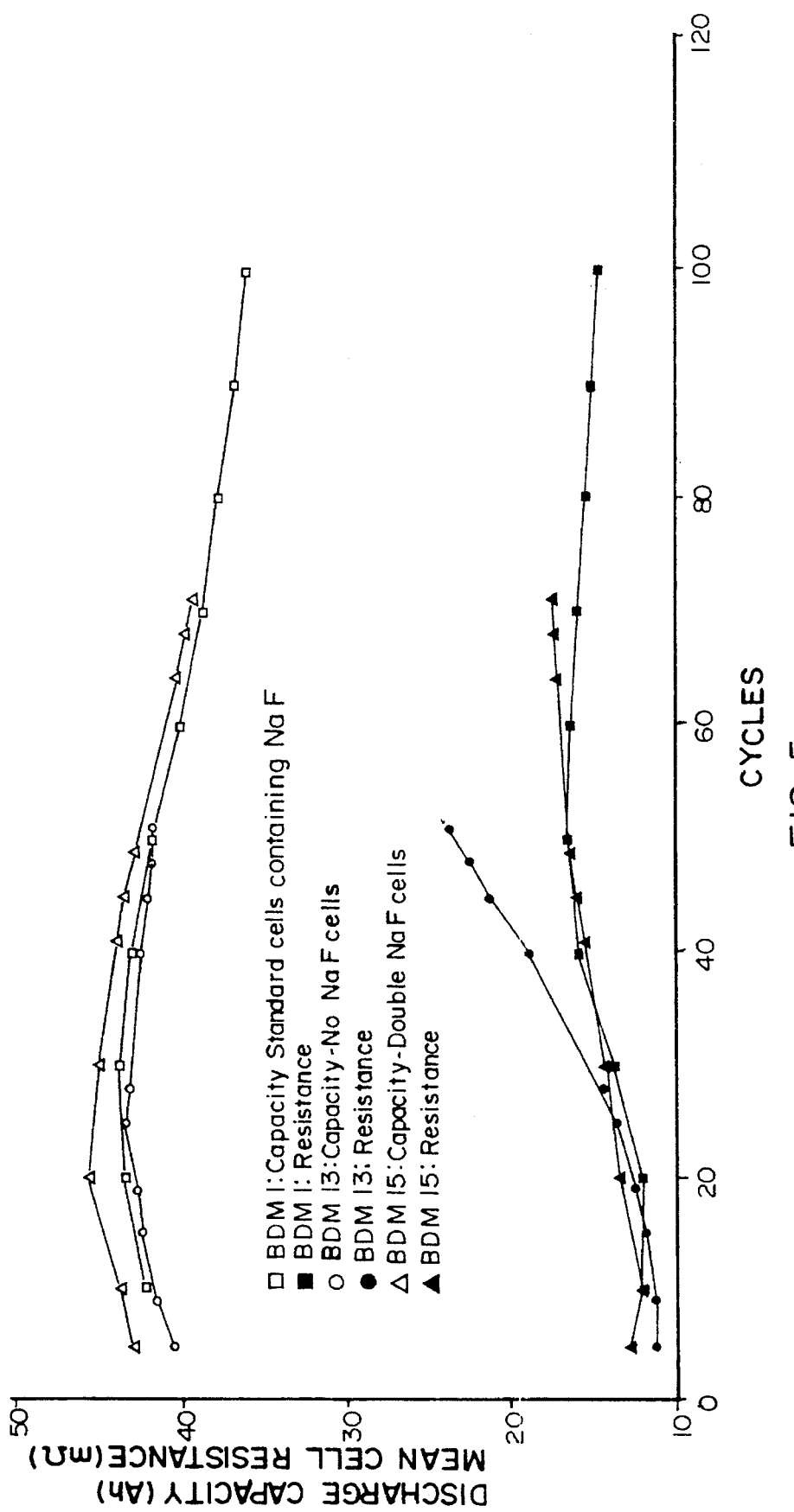
FIG. 5 shows a plot of discharge capacity and mean cell resistance against charge/discharge cycles to show the effect of sodium fluoride addition on cell performance.

Another dopant which can be added in amounts up to 5% or more by mass based on the total mass of the powder blend, is sodium fluoride. Sodium fluoride (NaF) provides useful extra cell capacity, and is very volume efficient. For example, 1 cm$^3$ of NaF gives 1.62Ah, while 1cm$^3$ of NaCl give 0.99Ah. Moreover, inclusion of NaF in amounts as low as 1.5% by mass improves long term stability of the cell and reduces its sensitivity to overcharge. Thus, the potential span on charge increased by the inclusion of NaF. FIG. 5 shows the cycle history of 3 10-cell modules cycled using an IU charging regime and charged at 2.8V per cell. It can be seen that the mean cell resistance of the module with no NaP deteriorates rapidly with cycling. Thus, after 50 cycles, the mean resistance of the cells without NaF increased from 11 mohm to more than 25 mohm.

During discharge of the cell 10, as reflected in equation (1), nickel chloride is reduced to metallic nickel. Even though the nickel powder precursor has a high surface area, the continual reformation of nickel on cycling causes the nickel crystals to grow in size and loose surface area. As this happens, capacity is lost. However, to poison this crystal growth phenomena and maintaining, and in some cases even enhancing the nickel surface area, a dopant in the form of a chalcogen such as sulphur or selenium, a metal chalcogenide such as a sulphide or selenide of Fe, Co, Ni and Mo, and certain transition metals, such as Co, Fe, Ti, V, W and Mo, can be added in small quantities to the powder mix. In a cathode produced by a sintering process, the inclusion of chalcogens or chalcogenides prior to sintering is not possible since they are not always stable in the high temperature reducing atmosphere used for sintering.

Figure 6:
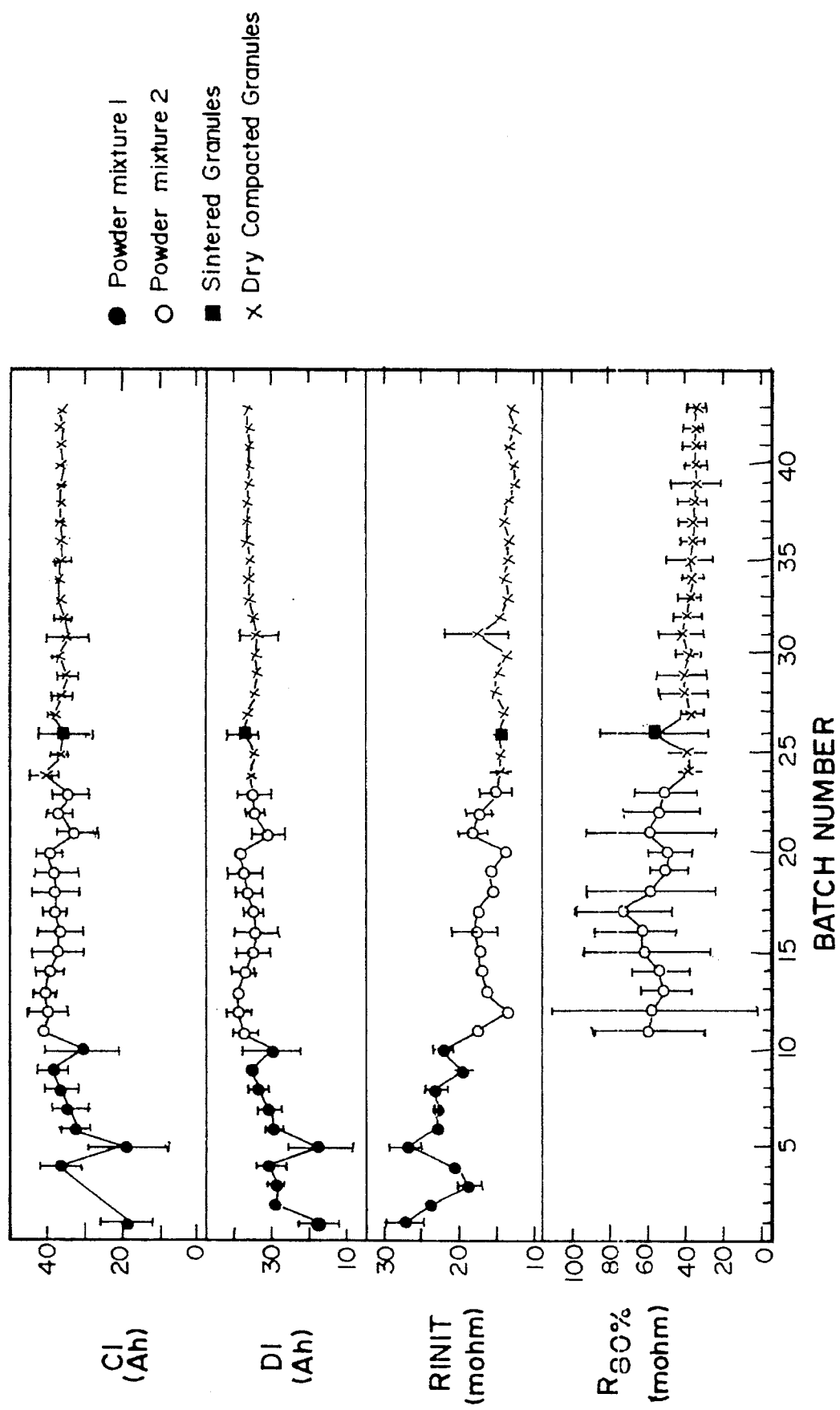
FIG. 6 shows the first charge (C1) and discharge (D1) capacities, initial resistance (Rinit) and 80% d.o.d. resistance plotted for batches of cells in accordance with FIG. 1, with the error bars indicating the spread of properties for each batch of cells.

Advantages of using a cathode which is initially in granular form, ie a granular cathode precursor, as compared to a powdered cathode precursor which is subsequently sintered, include the following:

Even though the components are homogeneously blended when a powdered mix is used, the powder particles tend to separate during vibration which occurs both in transporting the material and in loading the material into the cell. By using granules, homogeneity of the mix is maintained. This in turn leads to cells which are very reproducible, which is essential for battery use. Table 1 shows the cell characteristics of the first charge and discharge cycles of a group of cells which have been charged and discharged coulometrically in a single string. It will be noted that the cells are closely matched in resistance and capacity. This is an essential prerequisite for cells used to make electric vehicle batteries which consist of several hundreds such cells. The improvement utilizing granules is further illustrated in FIG. 6 which shows first cycle capacities and resistances for powder and granular cathode cells. It can be seen that the granular cathodes of cells in accordance with the invention are much more closely matched.

TABLE 1

| Charge Capacity: | 49.3 Ah (at 2.75 A) | | | | | |
|---|---|---|---|---|---|---|
| Discharge Capacity: | 42.5 Ah (at 12 A) | | | | | |
| Temperature: | 325° C. | | | | | |

| Cell No. | Maximum Chge. Volts | Minimum Dsch. Volts | R initial mohm | R 21.0 mohm | R 28.8 mohm | R 32.0 mohm | PASS FAIL |
|---|---|---|---|---|---|---|---|
| 37 | 2.86 | 1.92 | 11.3 | 20.1 | 23.5 | 26.0 | PASS |
| 38 | 2.86 | 1.92 | 11.3 | 20.1 | 23.6 | 26.0 | PASS |
| 39 | 2.86 | 1.92 | 11.1 | 20.0 | 23.5 | 26.0 | PASS |
| 40 | 2.86 | 1.90 | 10.8 | 19.8 | 23.5 | 25.9 | PASS |
| 41 | 2.86 | 1.86 | 10.6 | 19.7 | 23.2 | 25.6 | PASS |
| 42 | 2.88 | 1.94 | 10.7 | 19.5 | 22.8 | 25.0 | PASS |
| 43 | 2.86 | 1.90 | 10.7 | 20.0 | 23.3 | 25.5 | PASS |
| 44 | 2.86 | 1.90 | 10.1 | 81.9 | 22.6 | 25.0 | PASS |
| 45 | 2.88 | 1.84 | 11.1 | 20.0 | 23.5 | 25.9 | PASS |
| 46 | 2.86 | 1.88 | 10.4 | 20.2 | 23.6 | 25.9 | PASS |
| 47 | 2.86 | 1.90 | 10.6 | 19.9 | 23.3 | 25.6 | PASS |
| 48 | 2.88 | 1.90 | 10.6 | 19.9 | 23.1 | 25.2 | PASS |
| 49 | 2.86 | 1.88 | 10.7 | 20.0 | 23.6 | 25.9 | PASS |
| 50 | 2.88 | 1.86 | 10.6 | 20.0 | 23.8 | 26.4 | PASS |
| 51 | 2.90 | 1.90 | 10.4 | 19.9 | 23.2 | 25.2 | PASS |
| 52 | 2.88 | 1.92 | 10.4 | 19.9 | 23.2 | 25.2 | PASS |
| 53 | 2.88 | 1.88 | 11.0 | 20.4 | 23.7 | 25.9 | PASS |
| 54 | 2.88 | 1.90 | 11.2 | 20.4 | 23.5 | 25.6 | PASS |
| 55 | 2.88 | 1.92 | 11.1 | 19.8 | 22.7 | 25.0 | PASS |
| 56 | 2.88 | 1.76 | 10.9 | 20.2 | 23.5 | 25.7 | PASS |
| 57 | 2.88 | 1.88 | 11.2 | 20.2 | 23.6 | 25.8 | PASS |
| 58 | 2.86 | 1.92 | 11.0 | 19.8 | 23.3 | 25.7 | PASS |
| 59 | 2.86 | 1.92 | 11.2 | 19.5 | 22.9 | 25.1 | PASS |
| 60 | 2.88 | 1.94 | 10.7 | 19.7 | 23.1 | 25.1 | PASS |
| 61 | 2.88 | 1.94 | 11.5 | 20.0 | 23.1 | 25.1 | PASS |
| 62 | 2.88 | 1.94 | 11.1 | 20.0 | 23.0 | 25.1 | PASS |
| 63 | 2.86 | 1.86 | 11.0 | 19.6 | 23.0 | 25.3 | PASS |
| 64 | 2.88 | 1.80 | 11.4 | 20.3 | 23.6 | 25.9 | PASS |
| 65 | 2.88 | 1.92 | 10.9 | 20.0 | 22.8 | 24.8 | PASS |
| 66 | 2.88 | 1.92 | 10.9 | 19.9 | 23.0 | 25.2 | PASS |
| 67 | 2.86 | 1.86 | 11.1 | 19.9 | 23.7 | 26.2 | PASS |
| 68 | 2.88 | 1.72 | 11.1 | 20.2 | 23.7 | 26.1 | PASS |
| 69 | 2.86 | 1.86 | 10.9 | 20.0 | 23.5 | 26.0 | PASS |
| 70 | 2.90 | 1.82 | 10.9 | 20.0 | 23.2 | 25.2 | PASS |
| 71 | 2.90 | 1.90 | 10.5 | 20.1 | 23.2 | 25.0 | PASS |
| 72 | 2.86 | 1.76 | 11.0 | 20.0 | 23.5 | 26.0 | PASS |
| Max All | 2.9 | 1.94 | 11.5 | 20.4 | 23.8 | 26.4 | 36 |
| Min All | 2.86 | 1.72 | 10.1 | 18.9 | 22.6 | 24.8 | |
| Ave Tot | 2.87 | 1.88 | 10.9 | 19.9 | 23.3 | 25.6 | |
| Std Dvs | 0.013 | 0.053 | 0.32 | 0.27 | 0.3 | 0.42 | |
| Ave All | 2.87 | 1.88 | 10.9 | 19.9 | 23.3 | 25.6 | |
| Std All | 0.013 | 0.053 | 0.32 | 0.27 | 0.3 | 0.42 | |

Total Passes: 36 out of 36

The granulation method of producing the cathode also improves the bulk density of the electrode, which improves the capacity per unit volume. For example, blending nickel powder (Inco nickel grade 287, 53.7% by weight) with sodium chloride (Microfine Grade <63 μ, 42.3% by mass) and 4% minor additives produces a powdered electrode of density 0.85g/cm$^3$. However, if this material is granulated as hereinbefore described, the granular electrode has a density in excess of 1.9 g/cm$^3$.

Figure 8:
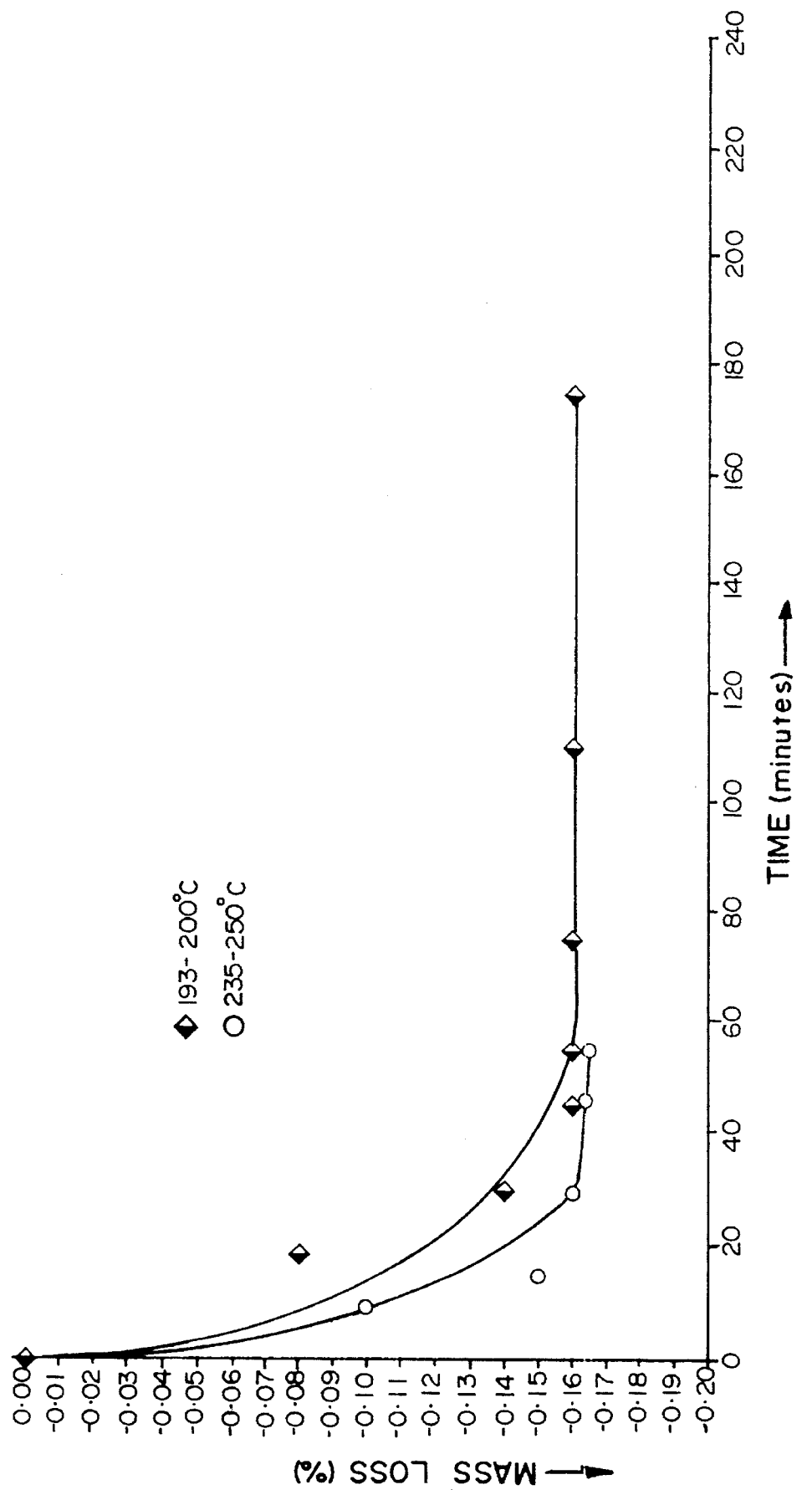
FIG. 8 shows plots of mass loss against time for microfine sodium chloride kept at various temperatures.

In this regard it is important to ensure that the salt is very dry and that the granules are prepared under conditions of low relative humidity. A particular grade of salt, known as pure dried vacuum salt, can be used. However, in view of the deliquescent properties of sodium chloride, regardless of how dry the salt seems, a film of saturated brine will be present on the salt surfaces. A drying procedure which involves heating the salt to 200°–250° C. or higher for a period of at least one hour or conveniently overnight, can thus conveniently be used. Some moisture is driven off typically to the extent of 0.1 to 0.2% (see FIG. 8).

Figure 9:
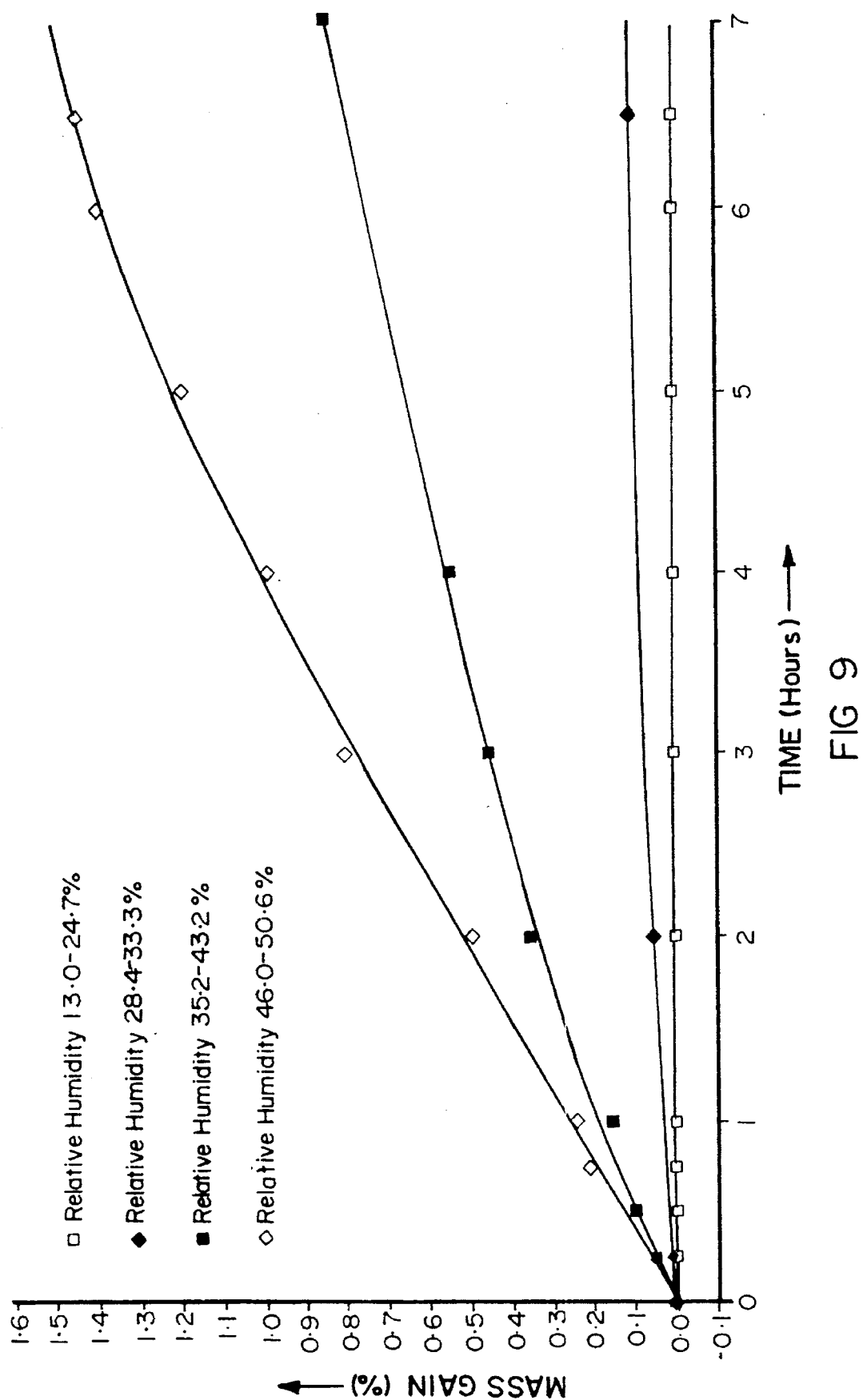
FIG. 9 shows plots of mass gain against time for granules kept at various relative humidities.

The granules are produced under conditions of low humidity, typically less than 30% relative humidity at 20° C. Above this humidity the granules react with moisture and increase in weight (see FIG. 9). Close observation of the granules has revealed that this weight increase is accompanied by what appears to be gassing around the aluminium particles in the granules. The chemistry thereof is unclear but possibly the reaction of aluminium with water in the presence of chloride ions liberates hydrogen gas. What is significant is that the powder mix becomes humidity-sensitive only after the compaction and granulation process.

Those familiar with molten salt processes will appreciate that the presence of even small quantities of moisture is wholly undesirable. Thus, it is important to prepare the granules in dry conditions, since the next stage in the assembly of the cell is the impregnation of these granules with the molten salt, $NaAlCl_4$. Even small quantities of moisture cause vigorous effervescing with the liberation of gaseous hydrogen chloride.

An alternative to cold compaction followed by flake breaking to produce granules is to sinter a thin layer of nickel and salt at temperatures close to but not exceeding the melting point of salt (801° C.). The thin porous nickel salt plate that results can be broken down to a granule composition in various ways. While this route offers some of the advantages of the dry composition route, the disadvantages of high temperatures, the requirement of a reducing atmosphere, and the difficulty of including additives are still present.

An important aspect of the cell assembly procedure is to impregnate the cathode with the molten salt electrolyte. This is substantially easier to achieve with granules than with powder as the liquid flows easily between the granules.

Figure 7:
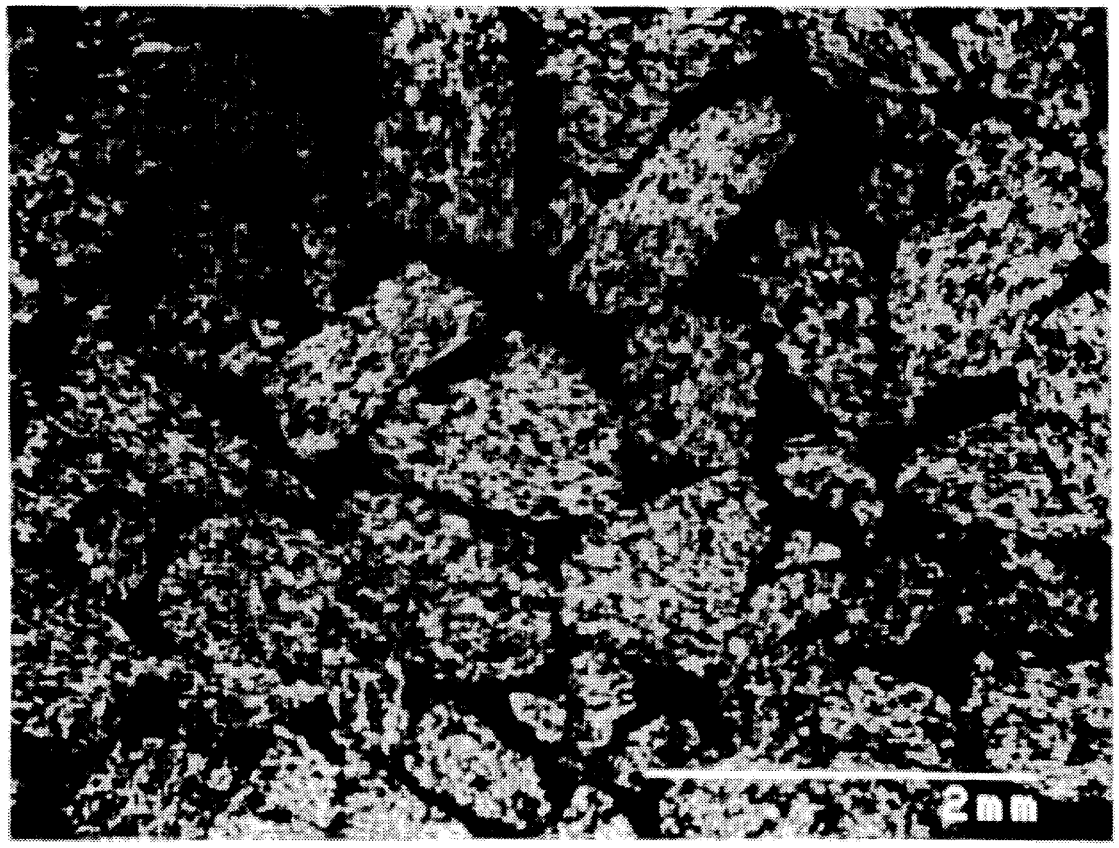
FIG. 7 shows a back scattered electron image of an edge of a polished section from the centre of the cathode of the cell of FIG. 1.

With a powdered or sintered electrode, pores are introduced into the electrode by incorporating pore agents or alternatively by the use of large grain sodium chloride, which is consumed during the charge process, although large grain sodium chloride may take several cycles to be fully consumed. With a granular cathode as hereinbefore described, macropores are already present in the spaces between the granules. These are easily accessible for liquid electrolyte so that the whole cathode is uniformly wetted by the electrolyte and thus performs reproducibly. From FIG. 7 it can be seen that pore diameters of up to 0.5 mm are present.

Granular cathodes are much easier to handle than powdered cathodes as there is less dust.

We claim:

1. A method of making a cathode for a high temperature rechargeble electrochemical cell, the method comprising impregnating a mixture, in granular form, of and alkali metal halide having a particle size <63μm and a substance comprising a transition metal selected from the group consisting of iron, nickel, cobalt, chromium, mangaese, and mixtures thereof, with an alkali metal aluminium halide molten salt electrolyte to form a cathode precursor; and subjecting the cathode precursor to at least one charge cycle in a high temperature electrochemical cell in which the cathode precursor forms the cathode and is located in a cathode compartment of the cell, which is separated from an anode compartment by a solid electrolyte separator, and alkali metal forming in the anode compartment during the charge cycle.

2. A method according to claim 1, wherein the alkali metal and halide of the alkali metal halide, and of the molten salt electrolyte are the same, with the alkali metal being sodium and the halide being chlorine, so that the alkali metal halide is sodium chloride, and the electrolyte is sodium aluminium chloride.

3. A method according to claim 2, which includes, prior to the impregnation, forming the granular mixture by blending together sodium chloride in powder form and the transition metal in powder form; and granulating the resulting powdered blend.

4. A method according to claim 3, which includes using, in the blend, sufficient of the transition metal so that less than 50%, by mass, of the transition metal is used during charging, with the remainder acting as an electronically conducting backbone of the cathode when the cell is fully charged.

5. A method according to claim 3, wherein the granulation is effected by compacting the powdered blend, and breaking the compacted blend into granules.

6. A method according to claim 5, wherein the compaction of the blend is effected by passing the blend of powders between rollers at a pressure of 110–120 bar.

7. A method according to claim 3, which includes adding to the blend prior to granulation, at least one additive selected from the group consisting in (i) up to 1% by mass, based on the total blend mass, aluminium powder for generating additional $NaAlCl_4$ and a small starting amount of sodium on the first charge cycle; (ii) between 1.5% and 5%, based on the total blend mass, sodium fluoride (NaF) as dopant, to provide additional capacity, to enhance long term stability, and to reduce sensitivity of the cell to overcharging; and (iii) as an additive for poisoning nickel crystal growth a chalcogen, a metal chalcogenide, and/or a transition metal selected from the group consisting in cobalt, iron, titanium, vanadium, tungsten and molybdenum.

8. A method according to claim 3, wherein impregnation of the granular mixture with the molten salt electrolyte is effected by saturating the mixture with the molten salt electrolyte in liquid form.

9. A method according to claim 3, wherein, prior to the impregnation, the granules are consolidated and heated to a temperature greater than the melting temperature of the electrolyte before the molten electrolyte is impregnated into the mixture.

10. A method of making a cathode precursor for a high temperature rechargeable electrochemical cell, the method comprising impregnating a mixture, in granular form, of an alkali metal halide having a particle size <63μm and a substance comprising a transition metal selected from the group consisting of iron, nickel, cobalt, chromium, manganese, and mixtures thereof, with an alkali metal aluminum halide molten salt liquid electrolyte.

11. A method as claimed in claim 10, which includes loading the mixture into a container having a wall at least partially comprising solid electrolyte and lining the surface of the solid electrolyte remote from the mixture with a wicking material for wicking anode material over said surface.

12. A cathode precursor for a high temperature rechargeable electrochemical cell, the precursor comprising a mixture, in granular form, of an alkali metal halide having a particle size of <63 µm and a substance comprising a transition metal selected from the group consisting of iron, nickel, cobalt, chromiun, manganese and mixture thereof, with the mixture impregnated with an alkali metal aluminium halide molten salt electrolyte; and a container containing the mixture, with the container forming a cathode compartment for use in an electrochemical cell, and the container having a wall at least partially comprising solid electrolyte material.

13. A cathode precursor according to claim 12, in which the solid electrolyte has, on its surface remote from the impregnated mixture, a layer of wicking material thereon for wicking molten anode material over said surface.

14. An electrochemical cell precursor which comprises a cathode precursor according to claim 12, and means defining and anode compartment separated from the cathode compartment by said wall at least partially comprising solid electrolyte material.

15. A method of making a high temperature rechargeable electrochemical cell precursor which comprises loading a cathode precursor according to claim 12 into a cell casing having means defining an anode compartment separated from the cathode compartment by said wall at least partially comprising solid electrolyte material.

* * * * *

UNITED STATES PATENT AND TRADEMARK OFFICE
CERTIFICATE OF CORRECTION

PATENT NO. : 5,536,594

DATED : July 16, 1996

INVENTOR(S) : Galloway and Wright

It is certified that error appears in the above-identified patent and that said Letters Patent is hereby corrected as shown below:

In claim 1, column 9, line 62, delete "and" and insert --an-- therefor.

In claim 1, column 9, line 65, delete "mangaese" and insert --manganese-- therefor.

In claim 12, column 11, line 4, delete "mixture" and insert --mixtures-- therefor.

In claim 14, column 12, line 3, delete "and" and insert --an-- therefor.

Signed and Sealed this

Eighth Day of October, 1996

BRUCE LEHMAN

Attest:

Attesting Officer

Commissioner of Patents and Trademarks